(12) United States Patent
Zhang et al.

(10) Patent No.: US 12,197,515 B2
(45) Date of Patent: Jan. 14, 2025

(54) DIAGNOSTIC TROUBLE CODE SIGNATURE CLASSIFICATION FOR DOWNHOLE TOOL FAULT IDENTIFICATION

(71) Applicant: Halliburton Energy Services, Inc., Houston, TX (US)

(72) Inventors: Wei Zhang, Humble, TX (US); Umut Zalluhoglu, Humble, TX (US); Reena Agarwal Chanpura, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 594 days.

(21) Appl. No.: 17/461,528

(22) Filed: Aug. 30, 2021

(65) Prior Publication Data

US 2022/0277045 A1    Sep. 1, 2022

Related U.S. Application Data

(60) Provisional application No. 63/154,443, filed on Feb. 26, 2021.

(51) Int. Cl.
*G06F 16/901* (2019.01)
*G06F 16/906* (2019.01)
*G06F 16/909* (2019.01)
*E21B 47/12* (2012.01)

(52) U.S. Cl.
CPC ........ *G06F 16/909* (2019.01); *G06F 16/9017* (2019.01); *G06F 16/906* (2019.01); *E21B 47/12* (2013.01)

(58) Field of Classification Search
None
See application file for complete search history.

(56) References Cited

U.S. PATENT DOCUMENTS

| 8,204,697 B2 | 6/2012 | Garvey et al. |
| 9,535,185 B2 | 1/2017 | Olson et al. |
| 2010/0042327 A1 | 2/2010 | Garvey et al. |
| 2015/0176393 A1 | 6/2015 | Chok et al. |
| 2017/0101863 A1 | 4/2017 | Coste et al. |

(Continued)

FOREIGN PATENT DOCUMENTS

| GB | 2440631 | 8/2008 |
| KR | 10-2017-0060711 | 6/2017 |

OTHER PUBLICATIONS

International Search Report and Written Opinion for Application No. PCT/US2021/050113, dated Dec. 30, 2021.

(Continued)

*Primary Examiner* — Walter L Lindsay, Jr.
*Assistant Examiner* — Geoffrey T Evans
(74) *Attorney, Agent, or Firm* — Benjamin Ford; C. Tumey Law Group PLLC (57) ABSTRACT

A method and system for identifying a fault in a downhole tool. The method may comprise storing a plurality of diagnostic trouble codes (DTCs) from one or more previous downhole operations in a database, mapping the plurality of DTCs in the database, performing a downhole operation wherein a DTC is generated, and performing a determinative algorithm that uses pattern recognition to identify a fault caused by a DTC signature based on the one or more of the plurality of DTCs.

19 Claims, 4 Drawing Sheets

(56) References Cited

U.S. PATENT DOCUMENTS

| | | |
|---|---|---|
| 2018/0191867 A1* | 7/2018 | Siebel .................... G06N 20/20 |
| 2019/0203591 A1 | 7/2019 | Disko et al. |
| 2019/0234197 A1 | 8/2019 | Hall |
| 2020/0011167 A1 | 1/2020 | Zhao et al. |
| 2020/0040720 A1 | 2/2020 | Zalluhoglu et al. |
| 2020/0072034 A1 | 3/2020 | Zalluhoglu et al. |
| 2020/0095849 A1 | 3/2020 | Demirer et al. |
| 2020/0095860 A1 | 3/2020 | Zalluhoglu et al. |
| 2020/0291765 A1 | 9/2020 | Chanpura et al. |
| 2020/0392833 A1 | 12/2020 | Sengul et al. |
| 2020/0392834 A1 | 12/2020 | Sengul et al. |
| 2020/0408084 A1 | 12/2020 | Gu et al. |
| 2021/0071477 A1 | 3/2021 | Zhao et al. |
| 2021/0095526 A1 | 4/2021 | Chanpura et al. |
| 2021/0103843 A1 | 4/2021 | Keller et al. |
| 2021/0164293 A1 | 6/2021 | Zhao et al. |
| 2021/0230993 A1 | 7/2021 | Zalluhoglu et al. |
| 2021/0238926 A1 | 8/2021 | Zalluhoglu et al. |
| 2021/0268620 A1* | 9/2021 | Louat ................ B23Q 17/2233 |

OTHER PUBLICATIONS

L. Kirschbaum, et al., IEEE Access, AI-driven maintenance Support for Downhole Tools and Electronics Operated in Dynamic Drilling Environments, 2017.

U.S. Appl. No. 16/880,078, filed May 21, 2020.

* cited by examiner

| DTC CODE | RUN 1 | | RUN 2 | | RUN 3 | | RUN 4 | | RUN 5 | |
|---|---|---|---|---|---|---|---|---|---|---|
| | FLAGGED | COUNT | FLAGGED | COUNT | FLAGGED | COUNT | FLAGGED | COUNT | FLAGGED | COUNT |
| DTC1 | 0 | 0 | 0 | 0 | 0 | 0 | 0 | 0 | 0 | 0 |
| DTC2 | 0 | 0 | 0 | 0 | 0 | 0 | 0 | 0 | 0 | 0 |
| DTC3 | 0 | 0 | 1 | 5 | 1 | 3 | 0 | 0 | 1 | 3 |
| DTC4 | 0 | 0 | 0 | 0 | 0 | 0 | 0 | 0 | 0 | 0 |
| DTC5 | 0 | 0 | 0 | 0 | 0 | 0 | 0 | 0 | 0 | 0 |
| DTC6 | 0 | 0 | 0 | 0 | 0 | 0 | 0 | 0 | 0 | 0 |
| DTC7 | 0 | 0 | 1 | 2 | 0 | 0 | 1 | 3 | 1 | 5 |
| DTC8 | 0 | 0 | 0 | 0 | 0 | 0 | 0 | 0 | 0 | 0 |
| DTC9 | 0 | 0 | 0 | 0 | 0 | 0 | 0 | 0 | 0 | 0 |
| DTC10 | 0 | 0 | 0 | 0 | 0 | 0 | 0 | 0 | 0 | 0 |
| DTC11 | 0 | 0 | 0 | 0 | 0 | 0 | 0 | 0 | 0 | 0 |
| DTC12 | 0 | 0 | 0 | 0 | 0 | 0 | 0 | 0 | 0 | 0 |
| DTC13 | 0 | 0 | 0 | 0 | 0 | 0 | 0 | 0 | 0 | 0 |
| DTC14 | 0 | 0 | 0 | 0 | 0 | 0 | 0 | 0 | 0 | 0 |
| DTC15 | 0 | 0 | 1 | 8 | 0 | 0 | 1 | 4 | 1 | 5 |
| DTC16 | 0 | 0 | 0 | 0 | 0 | 0 | 0 | 0 | 0 | 0 |
| DTC17 | 0 | 0 | 0 | 0 | 0 | 0 | 0 | 0 | 0 | 0 |
| DTC18 | 0 | 0 | 0 | 0 | 0 | 0 | 0 | 0 | 0 | 0 |
| DTC19 | 0 | 0 | 0 | 0 | 0 | 0 | 0 | 0 | 0 | 0 |
| DTC20 | 0 | 0 | 0 | 0 | 0 | 0 | 0 | 0 | 0 | 0 |
| DTC21 | 0 | 0 | 0 | 0 | 0 | 0 | 0 | 0 | 0 | 0 |
| DTC22 | 0 | 0 | 0 | 0 | 0 | 0 | 0 | 0 | 0 | 0 |
| DTC23 | 0 | 0 | 0 | 0 | 0 | 0 | 0 | 0 | 0 | 0 |
| DTC24 | 0 | 0 | 0 | 0 | 0 | 0 | 0 | 0 | 0 | 0 |
| DTC25 | 0 | 0 | 0 | 0 | 0 | 0 | 0 | 0 | 0 | 0 |

FIG. 6

DIAGNOSTIC TROUBLE CODE SIGNATURE CLASSIFICATION FOR DOWNHOLE TOOL FAULT IDENTIFICATION

BACKGROUND

In order to obtain hydrocarbons such as oil and gas, boreholes are drilled through hydrocarbon-bearing subsurface formations. During drilling operations, directionally drilling operations may by performed where the drilling direction may veer of an intended drilling path at an angle or even horizontally away from the drilling path. Directional drilling of a subterranean well and, in particular, controlling the angle and direction of drilling through selectable bending of a shaft is controlled by a steering sub connected to the drill bit. Due to the extreme environment experienced by directional drilling equipment, failure of machinery during drilling operations may be possible.

Currently, if a failure appears within the machinery, or the drilling path is outside of a pre-designated path, personnel may be notified of the failure. However, current technology only identifies that there is a failure. Interpretation of the failure depends heavily on driller's knowledge of field operations, drilling tools and data interpretation. The driller has to evaluate surface data, key performance indices for the service, and pulsed up real-time data from downhole tools to make quick and accurate decisions at the rig.

BRIEF DESCRIPTION OF THE DRAWINGS

These drawings illustrate certain aspects of some examples of the present disclosure and should not be used to limit or define the disclosure.

DETAILED DESCRIPTION

Described below are methods and systems for real-time health assessment of a rotary steerable system ("RSS"). However, the methods and systems described below may be utilized for any downhole tool. The proposed systems and methods include an intelligent and interactive real-time fault diagnosis and decision support system for rotary steerable system. Specifically, the organization and evaluation of diagnostic trouble codes (DTCs) in a database and leveraging the data with a determinative algorithm to perform a real time tool health assessment and fault identification. Use of DTC signature classifications may help assess tool health accurately, enable fast debug and repair and maintenance, thereby improving asset utilization and reduce repair and maintenance cost. Methods and system described below use previous generated DTCs from a downhole tool and historical data for DTC signature classification obtained from current operations to infer possible failure causes and associated probability. This may allow for leveraging the data with the determinative algorithm for repair and maintenance for quick turn around and improved asset utilization.

Figure 1:
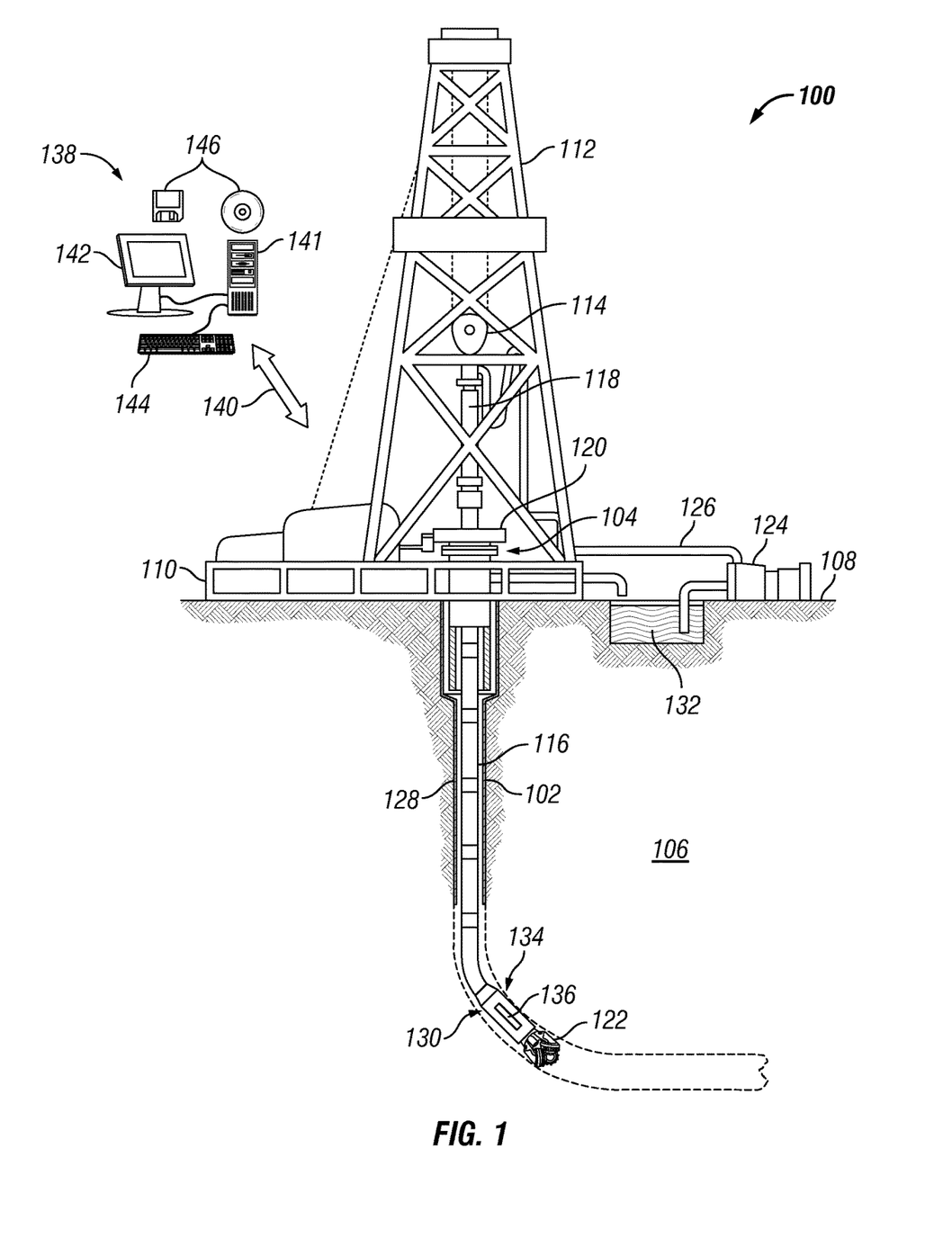
FIG. 1 illustrate an example of a drilling system.

FIG. 1 illustrates a drilling system 100 in accordance with example embodiments. As illustrated, borehole 102 may extend from a wellhead 104 into a subterranean formation 106 from a surface 108. Generally, borehole 102 may include horizontal, vertical, slanted, curved, and other types of borehole geometries and orientations. Borehole 102 may be cased or uncased. In examples, borehole 102 may include a metallic member. By way of example, the metallic member may be a casing, liner, tubing, or other elongated steel tubular disposed in borehole 102.

As illustrated, borehole 102 may extend through subterranean formation 106. As illustrated in FIG. 1, borehole 102 may extend generally vertically into the subterranean formation 106, however borehole 102 may extend at an angle through subterranean formation 106, such as horizontal and slanted boreholes. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend borehole 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse borehole 102. Drill bit 122 may be attached to a distal end of drill string 116 and may be driven, for example, either by a downhole motor and/or via rotation of drill string 116 from surface 108. Drill bit 122 may be a part of a rotary steerable tool (RSS) 130 at distal end of drill string 116. RSS 130 may further include tools for real-time health assessment of a rotary steerable tool during drilling operations. As will be appreciated by those of ordinary skill in the art, RSS 130 may be a measurement-while drilling (MWD) or logging-while-drilling (LWD) system.

RSS 130 may comprise any number of tools, such as sensors, transmitters, and/or receivers to perform downhole measurement operations or to perform real-time health assessment of a rotary steerable tool during drilling operations. For example, as illustrated in FIG. 1, RSS 130 may be included on and/or with a bottom hole assembly (BHA) 134. It should be noted that BHA 134 may make up at least a part of RSS 130. Without limitation, any number of different measurement assemblies, communication assemblies, battery assemblies, and/or the like may form RSS 130 with BHA 134. Additionally, BHA 134 may form RSS 130 itself. In examples, BHA 134 may comprise one or more sensors 136. Sensors 136 may be connected to information handling system 138, discussed below, which may further control the operation of sensors 136. Sensors 136 may include (accelerometers, magnetometers, temperature sensors, speed, position sensors, etc.). During operations, sensors 136 may process real time data originating from various sources such as diagnostics data, sensor measurements, operational data, survey measurements, sensory state, drilling system 100 state, BHA 134 state, RSS 130 state, and/or the like. Information and/or measurements may be processed further by information handling system 138 to determine real time heal assessment of rotary steerable tool.

Without limitation, RSS 130 may be connected to and/or controlled by information handling system 138, which may be disposed on surface 108. Without limitation, information handling system 138 may be disposed downhole in RSS 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until RSS 130 may be brought to surface 108. In examples, information handling system 138 may communicate with RSS 130 through a communication line (not illustrated) disposed in (or on) drill string 116. In examples, wireless communication may be used to transmit information back and forth between information handling system 138 and RSS 130. Information handling system 138 may transmit information to RSS 130 and may receive as well as process information recorded by RSS 130. In examples, a downhole information handling system (not illustrated) may include, without limitation, a microprocessor or other suitable circuitry, for estimating, receiving and processing signals from RSS 130. Downhole information handling system (not illustrated) may further include additional components, such as memory, input/output devices, interfaces, and the like. In examples, while not illustrated, RSS 130 may include one or more additional components, such as analog-to-digital converter, filter and amplifier, among others, that may be used to process the measurements of RSS 130 before they may be transmitted to surface 108. Alternatively, raw measurements from RSS 130 may be transmitted to surface 108.

Any suitable technique may be used for transmitting signals from RSS 130 to surface 108, including, but not limited to, wired pipe telemetry, mud-pulse telemetry, acoustic telemetry, and electromagnetic telemetry. While not illustrated, RSS 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from RSS 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole as information handling system 138 may be disposed on RSS 130. Likewise, information handling system 138 may process measurements taken by one or more sensors 136 automatically or send information from sensors 136 to the surface. As discussed above, the software, algorithms, and modeling are performed by information handling system 138. Information handling system 138 may perform steps, run software, perform calculations, and/or the like automatically, through automation (such as through artificial intelligence ("AI"), dynamically, in real-time, and/or substantially in real-time.

Figure 2:
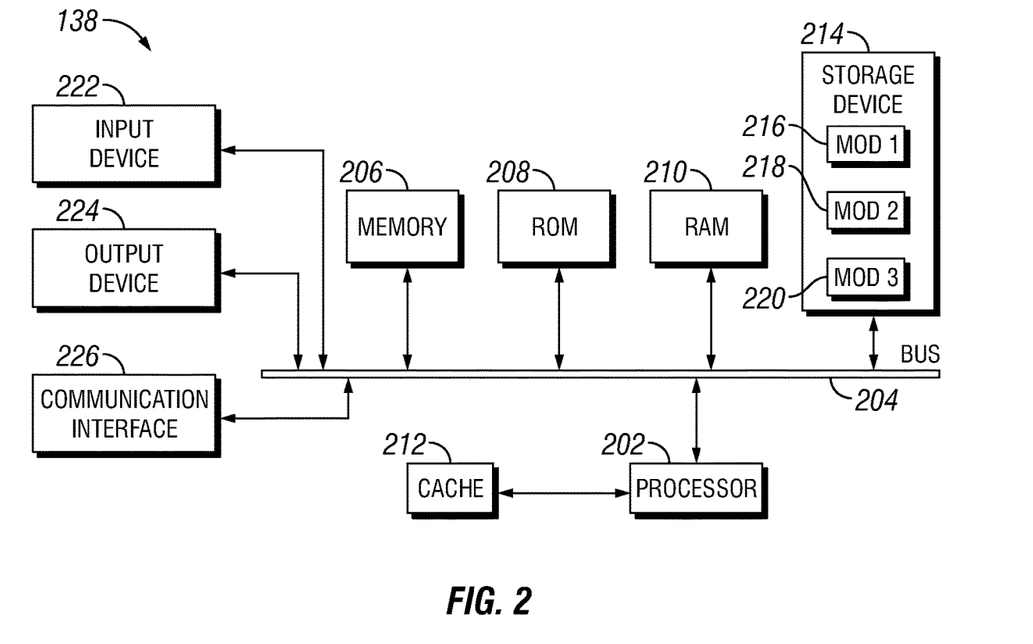
FIG. 2 is a schematic view of an information handling system.

FIG. 2 illustrates an example information handling system 138 which may be employed to perform various steps, methods, and techniques disclosed herein. Persons of ordinary skill in the art will readily appreciate that other system examples are possible. As illustrated, information handling system 138 includes a processing unit (CPU or processor) 202 and a system bus 204 that couples various system components including system memory 206 such as read only memory (ROM) 208 and random access memory (RAM) 210 to processor 202. Processors disclosed herein may all be forms of this processor 202. Information handling system 138 may include a cache 212 of high-speed memory connected directly with, in close proximity to, or integrated as part of processor 202. Information handling system 138 copies data from memory 206 and/or storage device 214 to cache 212 for quick access by processor 202. In this way, cache 212 provides a performance boost that avoids processor 202 delays while waiting for data. These and other modules may control or be configured to control processor 202 to perform various operations or actions. Other system memory 206 may be available for use as well. Memory 206 may include multiple different types of memory with different performance characteristics. It may be appreciated that the disclosure may operate on information handling system 138 with more than one processor 202 or on a group or cluster of computing devices networked together to provide greater processing capability. Processor 202 may include any general purpose processor and a hardware module or software module, such as first module 216, second module 218, and third module 220 stored in storage device 214, configured to control processor 202 as well as a special-purpose processor where software instructions are incorporated into processor 202. Processor 202 may be a self-contained computing system, containing multiple cores or processors, a bus, memory controller, cache, etc. A multi-core processor may be symmetric or asymmetric. Processor 202 may include multiple processors, such as a system having multiple, physically separate processors in different sockets, or a system having multiple processor cores on a single physical chip. Similarly, processor 202 may include multiple distributed processors located in multiple separate computing devices but working together such as via a communications network. Multiple processors or processor cores may share resources such as memory 206 or cache 212 or may operate using independent resources. Processor 202 may include one or more state machines, an application specific integrated circuit (ASIC), or a programmable gate array (PGA) including a field PGA (FPGA).

Each individual component discussed above may be coupled to system bus 204, which may connect each and every individual component to each other. System bus 204 may be any of several types of bus structures including a memory bus or memory controller, a peripheral bus, and a local bus using any of a variety of bus architectures. A basic input/output (BIOS) stored in ROM 208 or the like, may provide the basic routine that helps to transfer information between elements within information handling system 138, such as during start-up. Information handling system 138 further includes storage devices 214 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 214 may include software modules 216, 218, and 220 for controlling processor 202. Information handling system 138 may include other hardware or software modules. Storage device 214 is connected to the system bus 204 by a drive interface. The drives and the associated computer-readable storage devices provide nonvolatile storage of computer-readable instructions, data structures, program modules and other data for information handling system 138. In one aspect, a hardware module that performs a particular function includes the software component stored in a tangible computer-readable storage device in connection with the necessary hardware components, such as processor 202, system bus 204, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 138 is a small, handheld computing device, a desktop computer, or a computer server. When processor 202 executes instructions to perform "operations", processor 202 may perform the operations directly and/or facilitate, direct, or cooperate with another device or component to perform the operations.

As illustrated, information handling system 138 employs storage device 214, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 208, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 138, an input device 222 represents any number of input mechanisms, such as a microphone for speech, a touch-sensitive screen for gesture or graphical input, keyboard, mouse, motion input, speech and so forth. Additionally, input device 222 may take in data from one or more sensors 136, discussed above. An output device 224 may also be one or more of a number of output mechanisms known to those of skill in the art. In some instances, multimodal systems enable a user to provide multiple types of input to communicate with information handling system 138. Communications interface 226 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 202, that is purpose-built to operate as an equivalent to software executing on a general purpose processor. For example, the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 208 for storing software performing the operations described below, and random-access memory (RAM) 210 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 138 may practice all or part of the recited methods, may be a part of the recited systems, and/or may operate according to instructions in the recited tangible computer-readable storage devices. Such logical operations may be implemented as modules configured to control processor 202 to perform particular functions according to the programming of software modules 216, 218, and 220.

In examples, one or more parts of the example information handling system 138, up to and including the entire information handling system 138, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application.

Figure 3:
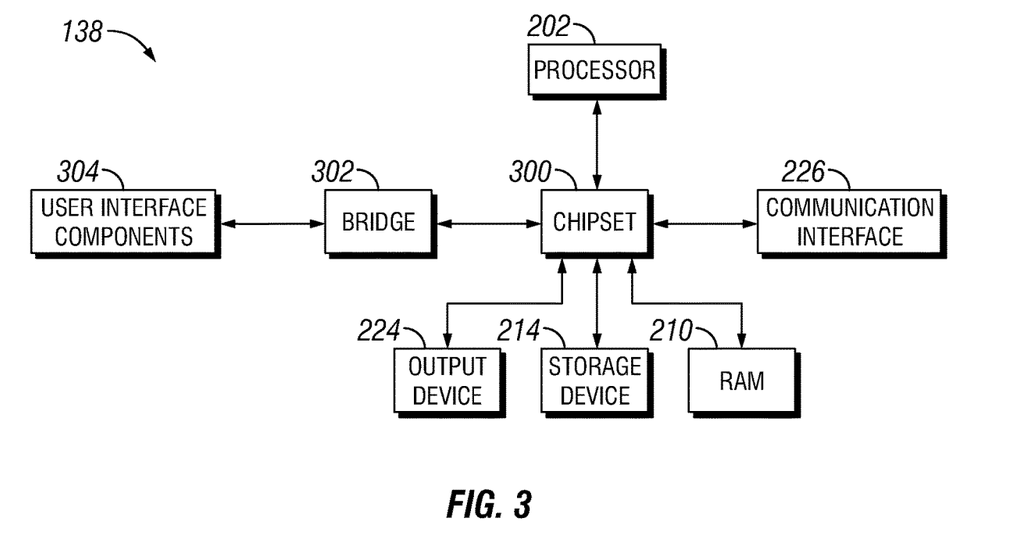
FIG. 3 is another schematic view of the information handling system.

FIG. 3 illustrates an example information handling system 138 having a chipset architecture that may be used in executing the described method and generating and displaying a graphical user interface (GUI). Information handling system 138 is an example of computer hardware, software, and firmware that may be used to implement the disclosed technology. Information handling system 138 may include a processor 202, representative of any number of physically and/or logically distinct resources capable of executing software, firmware, and hardware configured to perform identified computations. Processor 202 may communicate with a chipset 300 that may control input to and output from processor 202. In this example, chipset 300 outputs information to output device 224, such as a display, and may read and write information to storage device 214, which may include, for example, magnetic media, and solid-state media. Chipset 300 may also read data from and write data to RAM 210. A bridge 302 for interfacing with a variety of user interface components 304 may be provided for interfacing with chipset 300. Such user interface components 304 may include a keyboard, a microphone, touch detection and processing circuitry, a pointing device, such as a mouse, and so on. In general, inputs to information handling system 138 may come from any of a variety of sources, machine generated and/or human generated.

Chipset 300 may also interface with one or more communication interfaces 226 that may have different physical interfaces. Such communication interfaces may include interfaces for wired and wireless local area networks, interfaces for broadband wireless networks, as well as personal area networks. Some applications of the methods for generating, displaying, and using the GUI disclosed herein may include receiving ordered datasets over the physical interface or be generated by the machine itself by processor 202 analyzing data stored in storage device 214 or RAM 210. Further, information handling system 138 receive inputs from a user via user interface components 304 and execute appropriate functions, such as browsing functions by interpreting these inputs using processor 202.

In examples, information handling system 138 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

During drilling operations information handling system 138 may process different types of the real time data originated from varied sampling rates and various sources, such as diagnostics data, sensor measurements, operations data, and or the like through one or more sensors 136 disposed at any suitable location within and/or on RSS 130. (e.g., referring to FIG. 1). These measurements from one or more sensors 136 may allow for information handling system 138 to perform real-time health assessment of the rotary steerable tool.

A health assessment may be performed by processing measurements to determine if faults may be present. For example, measurements taken by sensors 136 may be processed by information handling system 138 to determine various faults through various fault detection techniques. Various fault detection techniques may include thresholds, range checks, limit check, cumulative sum, and/or the like. These fault detection techniques may be performed by information handling system 138 either disposed on RSS 130 or at the surface, as illustrated in FIG. 1.

Figure 4:
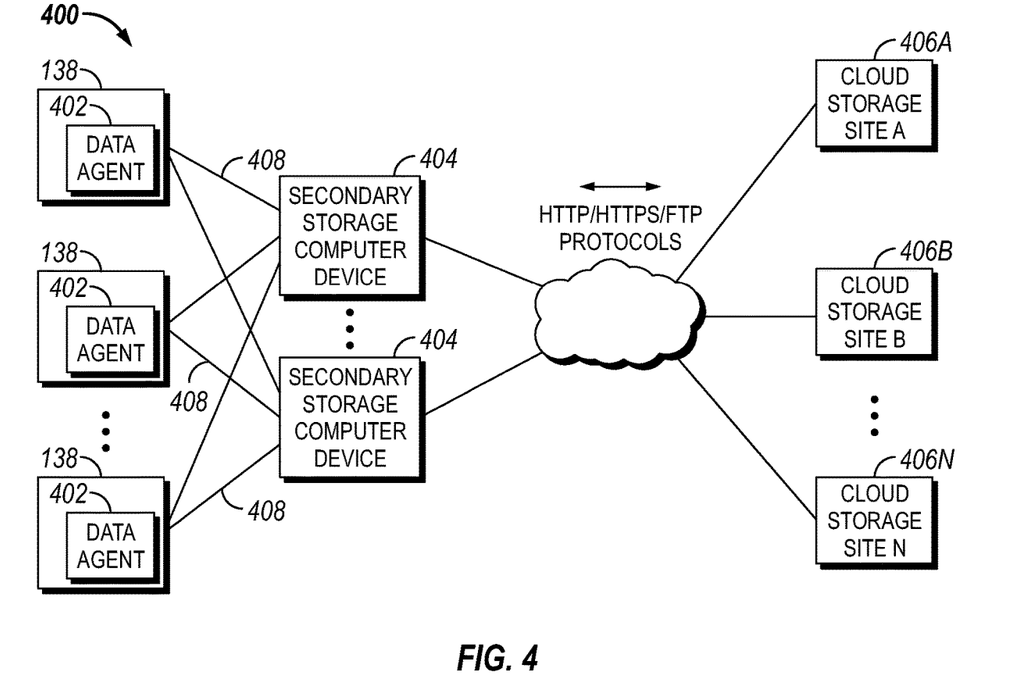
FIG. 4 is a schematic view of a network.

FIG. 4 illustrates an example of one arrangement of resources in a computing network 400 that may employ the processes and techniques described herein, although many others are of course possible. As noted above, an information handling system 138, as part of their function, may utilize data, which includes files, directories, metadata (e.g., access control list (ACLS) creation/edit dates associated with the data, etc.), and other data objects. The data on the information handling system 138 is typically a primary copy (e.g., a production copy). During a copy, backup, archive or other storage operation, information handling system 138 may send a copy of some data objects (or some components thereof) to a secondary storage computing device 165 by utilizing one or more data agents 402.

A data agent 402 may be a desktop application, website application, or any software-based application that is run on information handling system 138. As illustrated, information handling system 138 may be disposed at any rig site (e.g., referring to FIG. 1) or repair and manufacturing center. The data agent may communicate with a secondary storage computing device 404 using communication protocol 408 in a wired or wireless system. The communication protocol 408 may function and operate as an input to a website application. In the website application, field data related to pre- and post-operations, generated DTCs, notes, and the like may be uploaded. Additionally, information handling system 138 may utilize communication protocol 408 to access processed measurements, operations with similar DTCs, troubleshooting findings, historical run data, and/or the like. This information is accessed from secondary storage computing device 404 by data agent 402, which is loaded on information handling system 138.

Secondary storage computing device 404 may operate and function to create secondary copies of primary data objects (or some components thereof) in various cloud storage sites 406A-N. Additionally, secondary storage computing device 404 may run determinative algorithms on data uploaded from one or more information handling systems 138, discussed further below. Communications between the secondary storage computing devices 404 and cloud storage sites 406A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 406A-N, the secondary storage computing device 404 may also perform local content indexing and/or local object-level, sub-object-level or block-level deduplication when performing storage operations involving various cloud storage sites 406A-N. Cloud storage sites 406A-N may further record and maintain DTC code logs for each downhole operation or run, map DTC codes, store repair and maintenance data, store operational data, and/or provide outputs from determinative algorithms that are fun at cloud storage sites 406A-N. This type of network may be utilized to identify faults within RSS 130 (e.g., referring to FIG. 1) or any other downhole tool.

Figure 5:
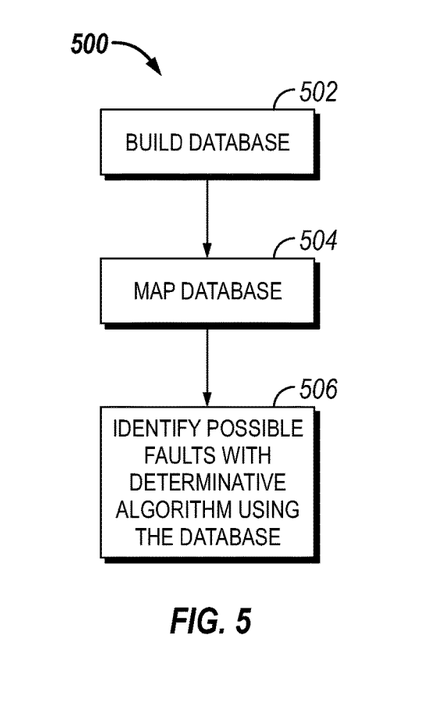
FIG. 5 is a flow chart for machine learning training to identifying possible faults in a downhole tool.

FIG. 5 illustrates a workflow 500 for identifying possible faults within RSS 130 (e.g., referring to FIG. 1) or another downhole tool. During downhole operations RSS 130 or other downhole tool may experience internal or external failures. Expensive rig time may be wasted if RSS 130 or downhole tool is not properly diagnosed and repaired. The described system and method may allow a technician to troubleshoot issues, faults, and breakdowns of RSS 130 or downhole tool at the rig site. Such troubleshooting will allow a technician to determine if RSS 130 or downhole tool is capable of further operations based on DTCs. Additionally, DTCs may speed up repair and ultimately downtime. Further, identifying issues that may be experienced at a specific geographical area may allow a technician to plan and ship additional parts to the specified geographical area before breakdowns occur. This may reduce downtime even further as parts needed to repair common issues in the geographical area may be readily on hand.

Workflow 500 may be utilized to classify DTC signatures from RSS 130 (e.g., referring to FIG. 1) using a determinative algorithm based on historical datasets from tool health assessment and fault identification. A determinative algorithm is defined as an optimization of values but does not consider uncertainties when performing the optimization. DTC signatures may comprise of a single DTC code or multiple DTC codes that get flagged together within a certain pre-defined time period depending on the failure mechanism. In examples, workflow 500 may be accessed by the information handling system 138 real time at the rig site or at repair and maintenance (R&M) shop via software interfaces (e.g., Rest APIs). This may allow information handling system 138 to pre-condition memory, surface and real-time data as described in FIGS. 2 and 3, and provide data as one or more inputs for workflow 500. Additionally, outputs from workflow 500 may be accessed by information handling system 138 to enable rig site and R&M decisions.

Workflow 500 may begin with block 502. In block 502, a diagnostic trouble code (DTC) database is generated. The database may be populated with DTC datasets for any number of downhole tools after every downhole operation (downhole operations may represent single trip, a subset of single trip, and/or multiple trips), such as RSS 130 (e.g., referring to FIG. 1). During downhole operations or post run diagnostics, DTCs may be generated in event of mechanical, electrical, firmware failures experienced by RSS 130, and/or operational procedure related failures. Theses codes may identify to a technician possible causes for tool failure or degraded performance during downhole operations. Individual DTCs may be further attached to information associated with the downhole operation. For example, the DTC was generated at an identified depth, an identified time, operating in an identified formation, operating in conjunction with another tool, and/or the like. Additionally, the DTC signature may be linked with observations made during repair. For example, a technician may make specific repairs that solve generated DTC(s). Repairs performed to restore functionality of the tool with the DTC signature obtained during or post run diagnostics may be linked. This information may be leveraged for future repair operations. Other information may be found from R&M findings, configuration, and firmware information.

For example, in the database DTC1 to DTC100 are unique diagnostic codes based on internal and calculated measurements for a given downhole tool. Additionally, a designation of "0" identifies that a DTC flag was not set based on downhole data and a designation of "1" indicates a DTC code was flagged by the downhole data for the downhole tool, or vice versa. These flags may be tied to specific mechanical, electrical, and/or operational procedure related issues. As discussed above, the databased may also have additional information. For example, additional information that may be tied to DTC flags may be number of occurrences of a particular DTC flag normalized over the run length or number of pump cycles from a single downhole operation. Additionally, field observations (for both successful runs and trip for failure runs) may be noted to specific DTC signature or to specific tools. Specific identified failures within RSS 130 (e.g., referring to FIG. 1) or downhole tool may be tied to a DTC signature. Additionally, how the failures are fixed during repair and maintenance may be linked to the DTC signature as well (both related to the field and post run shop failures). System configuration (Bus Master vs Slave, no flex vs tool flex, MARSS or Non-MARSS, type of telemetry system . . . ) of RSS 130 or downhole string may be linked with the DTC signature. After establishing the DTC database in block 502, the database is mapped in a mapping operation.

In block 504, the DTC database from block 502 is mapped in a mapping operation. Specifically, DTC logs after every downhole operation is converted to a Boolean array and stored as a row or column vector. For standardization purpose the arrays need to be stored as either row vectors or column vectors. Each row vector and/or column vector may also be referred to as feature vectors. Feature vectors may be utilized as inputs for machine learning methods and/or system. Additionally, decision needs to be made if the DTC log for entire or subset of downhole operation will be used. The frequency (number of occurrences of each pre-defined DTC) information may be added to the DTC vector set to form a matrix. The vectors or matrix formed in block 504 may be utilized further in a determinative algorithm to identify downhole runs (a run corresponds to a single downhole trip) with similar DTC signature. Block 504 may also link DTC information with the R&M and operational databases, which will help determine possible failure causes and repair needed for a DTC signature generated from downhole operation of interest.

In block 506, the vectors formed in block 504 may be utilized to identify possible faults with a determinative algorithm during or post downhole operations. Example of determinative algorithm is use of co-sine similarity metric to determine runs with similar DTC signature. Paired datasets with high comparative score imply those runs have similar DTC signature. A high comparative score is defined as a correlation between two vectors and over fifty percent of each run match in similar DTC signatures. For example, during a downhole operation, different DTCs may be generated at different times and different locations within a formation. During the downhole operation these DTCs are logged and displayed in real time. The logged and displayed DTCs are compared to the matrices that exist in databases formed in block 504 with a determinative algorithm. The determinative algorithm operates and functions to identify the likelihood of possible faults, from previous operations. To do this, the determinative algorithm may use the generated DTC in a pattern recognition operation, a run-based failure cause estimation operation, time-based failure cause estimation, or any combination thereof.

Pattern recognition may be performed by clustering DTC signatures of all (historical and new) runs in the database, so that failure causes of the historical runs in the same bucket with the new runs may guide troubleshooting. For example, when pattern recognition is applied, the database utilizes a Boolean array that includes all elements for all possible DTC codes. Such as, "1-True" indicating the code is observed in a run, and "0-False" indicating the code is not observed. Additionally, a numerical array consisting of elements for all possible DTC codes, the values representing number of times each DTC code was flagged in a run. This information is populated in real time and applied to the current downhole operation. Optionally, a number of features (dimensionality) may be reduced by applying principal component analysis (PCA), either linear PCA or Kernel PCA (nonlinear mapping). Pattern recognition may perform clustering using at least one of the following clustering algorithms, where K-mean clustering, fuzzy K-mean clustering, hierarchical clustering and mixture of Gaussians or using cosine similarity method. This may allow for the identification of previous failures in historical runs that may associate with the generated DTCs in the current downhole operation. In examples, identified causes may be viewed in descending probability, and use the list as a guide to perform troubleshooting.

Figure 6:
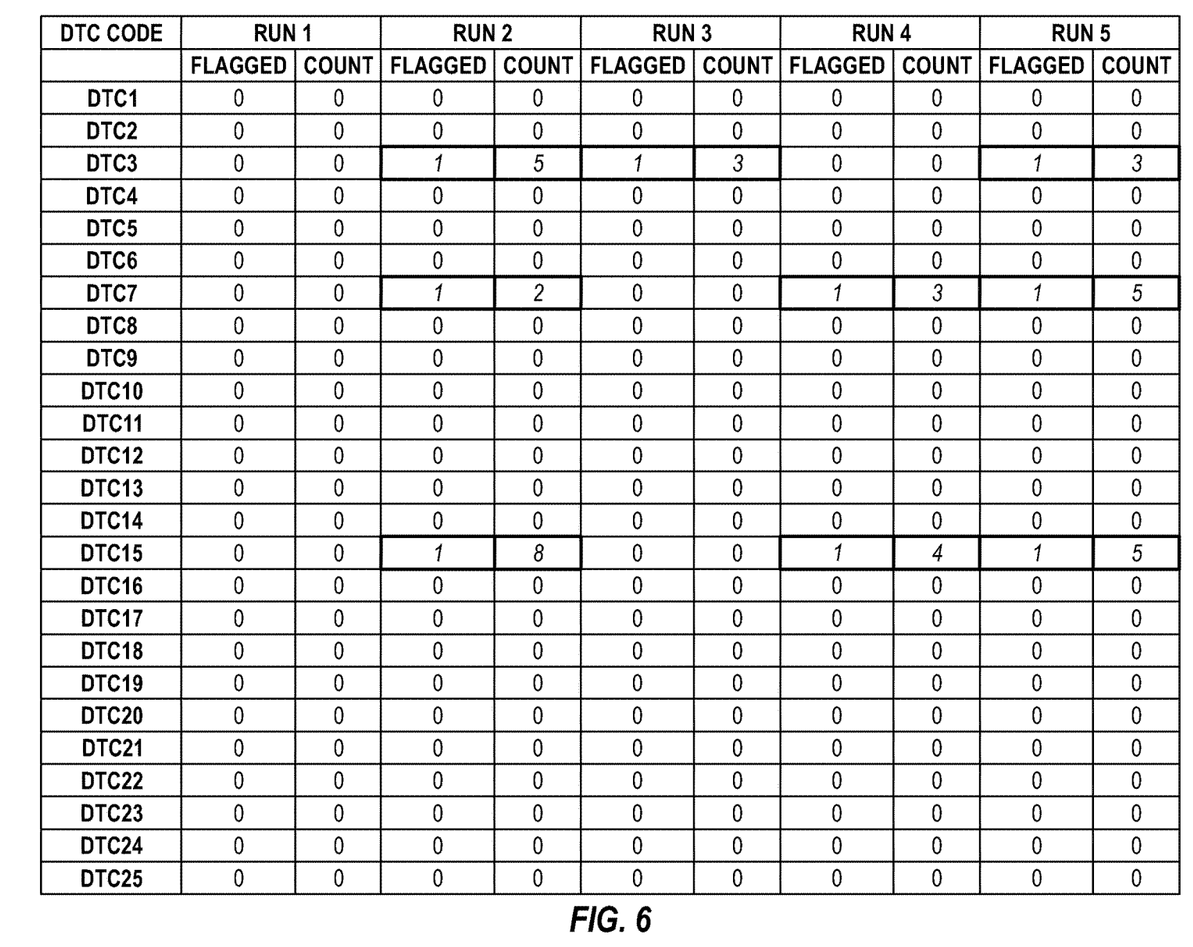
FIG. 6 illustrates a database with diagnostic trouble codes.

In examples, the determinative algorithm may utilize a run-based failure cause estimation. A run-based failure cause estimation may use historical run DTC signatures as inputs and the identified failure causes as labels, so that the determinative algorithm may be used to predict the highest probable failure causes for a downhole operations using generated DTCs found in previous downhole operations that are close to the generated DTCs in the current downhole operation. Similar to pattern recognition, discussed above, the formed database in block 502 includes a set with at least one a Boolean array consisting of elements for all possible DTC codes. "1-True" indicating the code is observed in a run, and "0-False" indicating the code is not observed, and/or a numerical array consisting of elements for all possible DTC codes, the values representing number of times each DTC code was flagged in a run. For every historical run, stored in the database, a Boolean output vector is formed that may include all possible failure causes, where the observed failure cause is flagged as "True" and the unobserved failure causes are flagged as "False." This information is then applied to the current/most recent downhole operation using a run-based failure cause estimation as a determinative algorithm. In block 506, a supervised machine learning model may be trained by using historical run DTC signature sets as inputs and the identified failure cause sets as outputs, via at least one of the following: logistic regression, neural network, random forest, support vector machines. This may allow the run-based failure cause estimation machine learning (ML) algorithm to predict probability of each failure cause using the trained model by inputting the new run's feature set with DTC signatures, list the failure cause probabilities in the descending order, or any suitable order, and use the list as a guide to perform troubleshooting, as seen in FIG. 6.

A time-based failure cause estimation may also be applied as a determinative algorithm. As discussed with other possible operations of the determinative algorithm, historical run DTC signatures may be stored in a database and the identified failure causes may be labeled. This may allow the determinative algorithm to identify the highest probable failure causes throughout a downhole operation using its DTC signature that is a function of time. As discussed above, the database in block 502 is populated with previous downhole operations and features a set with at least a time-series of all possible DTC codes. The time-series for possible DTC codes may be identified as "1-True" indicating the code is observed at a particular time stamp, and "0-False" indicating the code is not observed at that particular time stamp and/or a moving window of time-series of all possible DTC codes. Additionally, the number of times each DTC code was flagged within the timeframe of the moving window may be stored in the database. A moving window is defined as a range of time selected by personnel to review data. For example, a range of time for a moving window may be two hours or the first two hours in a downhole operation, etc. This database may store every historical run as a Boolean time-series that includes all possible failure causes is formed, where the observed failure cause is flagged as "True" and the unobserved failure causes are flagged as "False" throughout every time interval. Using a time-based failure cause as the determinative algorithm may allow the determinative algorithm to predict a probability of each failure cause using the trained model by inputting the new run's feature time-series with DTC signatures, list the failure cause probabilities that may have happened in every time interval in the descending order, and/or use the list as a guide to perform troubleshooting.

These improvements may allow for real time fault diagnostics of the drilling tool using a data-driven approach using a determinative algorithm. By forming a databased with historical data of diagnostic trouble code signature classifications obtained from previous operations, the identification of a generated DTC during a current downhole operation and solutions to fix or repair the DTC may be identified in real time. This may allow for troubleshooting faults, errors, and issues with a downhole tool to be fixed quickly and efficiently. Real time fault diagnostics information, health advisory, diagnostics-based plots and information on critical signals is accessible to any computer/smart device with proper authentication and network access. Such features may be useful for drilling operations and repair and maintenance shops as it provides real time information. This allows for the leveraging of information using a determinative algorithm for repair and maintenance for quick turn around and improved asset utilization. The systems and methods may include any of the various features of the systems and methods disclosed herein, including one or more of the following statements.

Statement 1: A method may comprise performing a downhole operation in which a plurality of diagnostic trouble codes (DTCs) are generated by a downhole tool, storing the plurality of diagnostic trouble codes from the downhole operation in a database, mapping the plurality of DTCs in the database, and performing a determinative algorithm that uses pattern recognition to identify a fault caused by a DTC signature based on the one or more of the plurality of DTCs.

Statement 2: The method of statement 1, further comprising clustering the plurality of DTCs in the database with a cosine similarity metric or a cluster algorithm.

Statement 3. The method of statement 2, wherein the clustering uses the cluster algorithm, and wherein the cluster algorithm is a K-mean clustering, a fuzzy K-mean clustering, a hierarchical clustering, or a Gaussians clustering.

Statement 4. The method of any preceding statements 1 or 2, further comprising diagnosing the downhole tool at a well site, a manufacturing location, or a repair and maintenance location based on the fault.

Statement 5. The method of any preceding statements 1, 2, or 4, further comprising identifying if the downhole tool can continue operations based on the fault.

Statement 6. The method of any preceding statements 1, 2, 4, or 5, further comprising fixing the fault on the downhole tool.

Statement 7. The method of any preceding statements 1, 2, or 4-6, distributing one or more parts of the downhole tool to one or more well sites based on the plurality of DTC at each of the one or more well sites.

Statement 8. A method may comprise storing a plurality of diagnostic trouble codes (DTCs) from one or more previous downhole operations in a database, mapping the plurality of DTCs in the database, performing a downhole operation wherein a DTC having a DTC signature is generated, performing a determinative algorithm that uses run-based failure cause estimation to identify a fault caused by the DTC signature based on the one or more of the plurality of DTCs, and fixing the fault.

Statement 9. The method of statement 8, further comprising diagnosing the downhole tool at a well site based on the fault.

Statement 10. The method of any preceding statements 8 or 9, further comprising identifying if the downhole tool can continue operations based on the fault.

Statement 11. The method of any preceding statements 8-10, further comprising fixing the fault on the downhole tool.

Statement 12. The method of any preceding statements 8-11, further comprising distributing one or more parts of the downhole tool to one or more well sites based on the plurality of DTC at each of the one or more well sites.

Statement 13. The method of any preceding statements 8-12, wherein the plurality of DTCs are mapped based on where the plurality of DTCs were generated in the downhole operation.

Statement 14. The method of any preceding statements 8-13, further comprising adding the DTC to the database.

Statement 15. A method may comprise storing a plurality of diagnostic trouble codes (DTCs) from one or more previous downhole operations in a database, mapping the plurality of DTCs in the database, performing a downhole operation wherein a DTC having a DTC signature is generated, performing a determinative algorithm that uses time-based failure cause estimation to identify a fault caused by the DTC signature based on the one or more of the plurality of DTCs, and fixing the fault.

Statement 16. The method of statement 15, further comprising diagnosing the downhole tool at a well site based on the fault.

Statement 17. The method of any preceding statements 15 or 16, further comprising identifying if the downhole tool can continue operations based on the fault.

Statement 18. The method of any preceding statements 15-17, further comprising fixing the fault on the downhole tool.

Statement 19. The method of any preceding statements 15-18, distributing one or more parts of the downhole tool to one or more well sites based on the plurality of DTCs at each of the one or more well sites.

Statement 20. The method of any preceding statements 15-19, wherein the plurality of DTCs are mapped based on one or more time stamps.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    performing a downhole operation in which a plurality of diagnostic trouble codes (DTCs) are generated by a downhole tool;
    storing the plurality of diagnostic trouble codes from the downhole operation in a database;
    mapping the plurality of DTCs in the database;

performing a determinative algorithm that uses pattern recognition to identify a fault caused by a DTC signature based on the one or more of the plurality of DTCs; and clustering the plurality of DTCs in the database with a cosine similarity metric or a cluster algorithm.

2. The method of claim 1, wherein the clustering uses the cluster algorithm, and wherein the cluster algorithm is a K-mean clustering, a fuzzy K-mean clustering, a hierarchical clustering, or a Gaussians clustering.

3. The method of claim 1, further comprising diagnosing the downhole tool at a well site, a manufacturing location, or a repair and maintenance location based on the fault.

4. The method of claim 1, further comprising identifying if the downhole tool can continue operations based on the fault.

5. The method of claim 1, further comprising fixing the fault on the downhole tool.

6. The method of claim 1, distributing one or more parts of the downhole tool to one or more well sites based on the plurality of DTC at each of the one or more well sites.

7. A method comprising:
storing a plurality of diagnostic trouble codes (DTCs) from one or more previous downhole operations in a database;
mapping the plurality of DTCs in the database;
performing a downhole operation wherein a DTC having a DTC signature is generated by a downhole tool;
performing a determinative algorithm that uses run-based failure cause estimation to identify a fault caused by the DTC signature based on the one or more of the plurality of DTCs;
clustering the plurality of DTCs in the database with a cosine similarity metric or a cluster algorithm; and
fixing the fault.

8. The method of claim 7, further comprising diagnosing the downhole tool at a well site based on the fault.

9. The method of claim 7, further comprising identifying if the downhole tool can continue operations based on the fault.

10. The method of claim 7, further comprising fixing the fault on the downhole tool.

11. The method of claim 7, further comprising distributing one or more parts of the downhole tool to one or more well sites based on the plurality of DTC at each of the one or more well sites.

12. The method of claim 7, wherein the plurality of DTCs are mapped based on where the plurality of DTCs were generated in the downhole operation.

13. The method of claim 7, further comprising adding the DTC to the database.

14. A method comprising:
storing a plurality of diagnostic trouble codes (DTCs) from one or more previous downhole operations in a database;
mapping the plurality of DTCs in the database;
performing a downhole operation wherein a DTC having a DTC signature is generated by a downhole tool;
performing a determinative algorithm that uses time-based failure cause estimation to identify a fault caused by the DTC signature based on the one or more of the plurality of DTCs;
clustering the plurality of DTCs in the database with a cosine similarity metric or a cluster algorithm; and
fixing the fault.

15. The method of claim 14, further comprising diagnosing the downhole tool at a well site based on the fault.

16. The method of claim 14, further comprising identifying if the downhole tool can continue operations based on the fault.

17. The method of claim 14, further comprising fixing the fault on the downhole tool.

18. The method of claim 14, distributing one or more parts of the downhole tool to one or more well sites based on the plurality of DTCs at each of the one or more well sites.

19. The method of claim 14, wherein the plurality of DTCs are mapped based on one or more time stamps.

* * * * *